United States Patent [19]

Restaino

[11] Patent Number: 4,999,419
[45] Date of Patent: Mar. 12, 1991

[54] POLYIMIDE RESINS FROM BIS-IMIDE, MONOMER HAVING TWO METHYLENE GROUPS ACTIVATED BY ADJACENT CARBONYLS, AND POLYAMINE

[75] Inventor: Alfred J. Restaino, Wilmington, Del.

[73] Assignee: Creative Assets and Consulting Corporation, Wilmington, Del.

[21] Appl. No.: 306,463

[22] Filed: Feb. 6, 1989

Related U.S. Application Data

[63] Continuation of Ser. No. 881,853, Jul. 3, 1986, Pat. No. 4,822,870.

[51] Int. Cl.$^5$ ............................................. C08G 73/12
[52] U.S. Cl. .................... 528/322; 528/170; 528/229; 528/246
[58] Field of Search ............... 528/322, 170, 229, 246

[56] References Cited

U.S. PATENT DOCUMENTS 4,822,870  4/1989  Restaino ........................... 528/322

Primary Examiner—Harold D. Anderson

[57] ABSTRACT

Polyimide addition copolymers of improved physical properties and thermal stability are prepared by reacting ethylenically unsaturated bis-imides with compounds having two methylene groups activated by adjacent carbonyl groups. The copolymers may be made in the presence of catalytic amounts of amines or with greater amounts of polyamines. The polymers are useful in producing molding powders, prepregs, laminates, circuit boards, encapsulants and metal clad shapes.

1 Claim, No Drawings

POLYIMIDE RESINS FROM BIS-IMIDE, MONOMER HAVING TWO METHYLENE GROUPS ACTIVATED BY ADJACENT CARBONYLS, AND POLYAMINE

This is a continuation of co-pending application Ser. No. 06/881,853 filed on July 3, 1986 now U.S. Pat. No. 4,822,870.

This invention relates to novel polyimide compositions for use in structural composites, reinforced laminates, prepregs, encapsulants and metal or plastic film clad sheets. In particular the invention is directed to addition copolymers with controlled cross-linking having good thermal stability which are made by reacting ethylenically unsaturated bis-imides with compounds containing at least two methylene groups activated by two adjacent carbonyl groups.

In accordance with the present invention polyimide polymer compositions are prepared which may be represented as having repetitive units characterized by the idealized general Formulas I or II (see Table of Formulas) wherein B and Z may be selected from various divalent radicals and wherein at least one R′, $R^2$ is —H, and the other is a halogen or an alkyl group having one to four carbon atoms. $R^3$ may be selected from the same or different monovalent radicals such as hydrogen and alkyl, alkaryl and alkoxy groups having up to 30 carbon atoms. Under most conditions only one active hydrogen on each methylene group is displaced as shown, however under more reactive conditions, a second hydrogen can be displaced from the group to form addition products.

The resins of the invention are made by reacting diactivated dimethylene compounds such as those selected from the general Formulas IIIa and IIIb with N,N′-bis-imides selected from the general Formula IX where D is a divalent radical having a carbon-carbon double bond such as maleimides selected from those having the general Formulas IVa and IVb. In the presence of an amine catalyst the reaction proceeds to completion in a relatively short period of time at a low temperature. The polymerization reaction can be conducted at a temperature of 0° to 200° C. and preferably in the range of 50° to 150° C. The mol ratio of the diethylenically unsaturated imide of general Formula IX to the diactive dimethylene compound of general Formulas IIIa and IIIb in the reaction mix may range from 0.5/1.0 to 20/1.0 and preferably 0.5/1-3/1. As the mol ratio approaches 1/1, copolymers containing higher molecular weight linear segments between crosslinks may be prepared at temperatures below about 150° C. to control vinyl polymerization. This offers excellent control of the physical properties of the resulting polymers and permits the synthesis of less brittle materials characteristic of most polyimides. Monoethylenically unsaturated imides of Formula IVb may be included in the reaction mix to control molecular weight.

The polymer of this invention can range in molecular weight from 500 to 20,000 at the prepreg stage and higher when fully cured to the thermoset stage.

The reaction may be carried out neat or in a non-reactive organic solvent system. Non-reactive organic polar solvents such as dimethylformamide, dimethylacetamide, 1-methyl-2-pyrrolidone, dimethylsulfoxide, or bis-methoxyethyl ether are preferable.

When polar solvents are used it is preferred to add to the system small amounts of selected compounds which inhibit free radical or ionic polymerization to stabilize the system and prevent gelation. Such compounds are benzoquinone, methane sulfonic acid, acetic acid and others. Methane sulfonic acid in concentrations as low as 50 ppm will prevent gelation. In a properly selected polar solvent such as dimethyl formamide the prepolymer results as a gel free viscous resin from which a film can be cast.

The polymerization reaction may frequently benefit by the addition of catalytic amounts of weak nitrogenous bases such primary, secondary and tertiary amines and quaternary ammonium bases. The tertiary amines and the quaternary ammonium bases constitute true catalysts. However, primary and secondary amines do also "catalyze" the reaction but also become an integral part of the polymeric structure.

The amines which are used to catalyze the Michael reaction may be represented by the general Formula VII and VIII wherein, $R^4$, $R^5$, $R^6$ and $R^7$ are independently hydrogen, and alkyl, cycloalkyl, aryl or an arylalkyl radical having up to 20 carbon atoms. Specific examples are listed in Formula VI.

The N,N′-bisimides useful in the invention are well-known and may be conveniently prepared from anhydrides and diamines as described in U.S. Pat. No. 2,444,536. Briefly this process comprises reacting an anhydride with a primary diamine to yield a bismaleamic acid. This bismaleamic acid is then cyclized with acetic anhydride using sodium acetate to yield the desired N,N′-bis-imide having the general Formula IX wherein D represents a divalent radical containing a carbon-carbon double bond and B is a divalent radical having at least 2 carbon atoms. (B) may represent linear or branched alkylene radicals having less than 13 carbon atoms, cycloalkylene radicals having 5 or 6 carbon atoms in the ring, heterocyclic radicals containing at least one of the atoms O, N and S, or a phenylene or polycyclic aromatic radical. These various radicals may carry substituents which do not give undesired side-reactions under the operating conditions. (B) may also represent a number of phenylene or alicyclic radicals connected directly to one another or by a divalent atom or group such as, for example, oxygen or sulphur, and alkylene groups of 1 to 3 carbon atoms, or one of the groups of Formula V in which $R^{13}$, $R^{14}$ and Y each represent alkyl groups of 1 to 4 carbon atoms, or a cycloalkyl radical having 5 or 6 carbon atoms in the ring, or a phenyl or polycyclic aromatic radical, and Q represents a straight or branched alkylene radical having less than 13 carbon atoms, a cycloalkylene radical having 5 or 6 carbon atoms in the ring, or a mono- or polycyclic arylene radical. The radical D is derived from an ethylenic anhydride of the Formula X which may be for example maleic anhydride, citraconic anhydride, and itaconic anhydride.

The preferred N,N′-bis-imide of Formula IX which may be employed are maleic N,N′-ethylene-bisimide, maleic N,N′-hexamethylene-bis-imide, maleic N,N′-metaphenylene-bis-imide, maleic N,N′-paraphenylene-bis-imide, maleic N,N′-4,4′-diphenylmethane-bis-imide, maleic N,N′-4,4′-diphenylether-bis-imide, maleic N,N′-4,4′ diphenylsulphone-bis-imide, maleic N,N′-4,4′-diphenylmethylhexane-bis-imide, maleic N,N′-α,α′-4,4′-dimethylenecylohexane-bis-imide, maleic N,N′-m-xylyene-bis-imide, and maleic N,N′-4,4′-diphenylcylohexane-bis-imide. Corresponding monoimides are made by reacting primary monoamines under similar circumstances with the above described anhydrides.

In general the N,N' bismaleimides which are described in general Formula IVa are useful wherein $R^1$ and $R^2$ are independently selected from the groups as previously defined.

The diactivated dimethylene compounds having at least 2 hydrogens on separate carbon atoms which are activated by adjacent carbonyl groups may be selected from compounds having the general Formula IIIa and IIIb where Z is a carbon-carbon bond; a divalent radical having at least 2 carbon atoms up to about 25 carbon atoms which may be alkyl, aliphatic, aromatic, cycloaliphatic, and aromatic or aliphatic groups substituted with lower alkyl groups having 1 to 6 carbon atoms; or a divalent radical having at least one carbon atom which is connected to at least one carbonyl through a heteroatom such as oxygen and nitrogen and the like as represented in Formula XII wherein $R^{15}$ is methylene, alkylene, arylene and $R^{16}$ is hydrogen, alkyl and aryl groups having up to 10 carbon atoms.

$R^3$ radicals maybe independently selected from any of those monovalent groups listed in the Table of Formulas listed under XI wherein $R^8$, $R^9$, $R^{10}$, $R^{11}$, and $R^{12}$ are independently selected from hydrogen, halogen, alkyl, arylalkyl, alkoxy, or alkylaromatics.

Polyimide resins have been used to impregnate fiberglass and carbon fiber sheets to form excellent prepregs which are useful in the manufacture of shaped articles and metal clad laminates for use as printed circuit boards which have resistance to high temperature, low thermal expansion, and retain a high level of electrical resistivity.

The resins of the invention are particularly useful in manufacturing prepregs which comprise a web of a fiber material coated or impregnated with a film or powder of the polyimide resin. Preferably the web consists of structural reinforcement such as carbon, graphite, boron, steel, silicon carbide, or glass fibers and the like. Fiber reinforced compositions of the invention are particularly improved in flowability, i.e. they require a relatively low molding temperature of 177° C., are non-flammable, have low smoke and toxicity, have improved impact strength and repairability, are improved in hot wet compression and moisture resistance, have thermal and mechanical stability. They are also useful in filament winding.

The polyimides of the invention may comprise mixtures and subsequent reaction products of another ethylenically unsaturated polyimide prepolymer, an epoxy resin, and a curing agent having at least 2 active hydrogens per molecule. Functional blends comprise at least 20% by weight of the polyimide resin of this invention.

The appropriate portions of the polyimide prepolymer made according to the invention may be mixed directly or physically dispersed with a filler or reinforcing agent, shaped by appropriate means and cured at temperatures ranging from 100° to 250° C. under pressure. A preferred method for making fiber reinforced articles is to form a solvent solution of the polyimide prepolymer and mix it with a solution of another prepolymer or directly with the reinforcing agent which is thereafter dried to form a polymer coated substrate. When such a substrate is a woven or non-woven web it is usually referred to as a prepreg. Multilayers of prepregs may be pressed together and cured at temperatures above 100° C. The resin may also be applied to the reinforcing material as a hot melt depending upon the melting point of the mixture. In such cases it is preferred to use bisdiketone/bis-imide mixtures that melt below 150° C. to avoid polymerization during application to fibers or fabrics. The addition of vinyl polymerization inhibitors and/or adjustment of the mol ratio of active methylene/bis-imide/amine compounds may be used to advantage to control viscosity. Woven and non-woven webs useful in making prepregs include organic or inorganic fibers for example fiberglass, carbon, graphite, boron, carbide coated boron, silicon carbide and organic synthetic fibers.

A prepreg made from the resin of the invention as described above may be pressed together to form a composite of multi-ply laminates which are bonded to a metal foil or resin film on one or both sides to form a metal or film clad laminate.

The resins are also particularly useful in forming shaped articles and clad laminates by reaction injection molding (RIM) techniques and in resin transfer molding (RTM) techniques to produce metal and organic film clad laminates using a single injection step. The process involves placing a metal foil or plastic film of known thickness on the cavity side of a heated metal mold, placing a fiberglass layer of predetermined weight over the metal foil or plastic film within the dimensions of the cavity, closing the mold and injecting a reaction injection processable blend of the bismaleimide/bisdiketone prepolymer of the invention into the mold to impregnate the glass cloth while simultaneously bonding to the foil to produce a laminate. After a predetermined mold residence time at a predetermined cure temperature the mold is opened to demold the finished clad article.

The metal foils used in making laminates may be selected from copper, aluminum, magnesium, silver, gold, titanium, and steel. Plastic films maybe selected from polyethersulphone, polyether etherketone, nylon, polyester, polyimide, polycarbonate, and polyvinyl fluroide among others. The following preparative examples are intended to serve as non-limiting illustrations of the novel polyimide copolymers, methods for their preparation, there use in the manufacture of prepregs and the subsequent use thereof in the manufacture of metal clad laminates and unless otherwise indicated all proportions are on a weight basis.

EXAMPLE 1

322 g of maleic N,N'-4,4'diphenylmethane-bis-imide, 181.2 g of 1,1'(1,4-phenylene)bis-4-methyl-1,3-pentanedione, 755 g of dimethylformamide and 26 mls of acetic acid were mixed in a 2-liter round bottom flask and heated to 70° C. 0.55 mls of triethylamine are added and the temperature increased to 80° C. After 2.2 hours the viscosity of the solution increased to 30 cps. and the polymer was precipitated in 3-gallons of distilled water, filtered, washed and dried.

A prepreg was made by pulling woven fiberglass cloth (Clark-Schwebel 7628 weave with a CS-209 finish) through a dimethylformamide solution of this polymer containing 57.9% solids. The prepreg was heated at 150° C. for 10 minutes.

An 8-ply, double-sided copper clad laminate was made from this prepreg. The laminate was made in a press using a temperature cycle of 5 minutes at 150° C., 15 minutes at 170° C. and 40 minutes at 200° C. A pressure of 400 psi was used. The laminate contains 35.6% resin. It was not postcured and had a room temperature flexural strength of 66,000 psi and a flexural strength of 39,000 psi at 204° C. (after etching the copper off).

EXAMPLE 2

322 g. of maleic N,N'-4,4'-diphenylmethane-bisimide, 150 g. of 1,1'(1,4-phenylene)bis-4-methyl-1,3-pentanedione, 738 g of dimethylformamide, 20 g of bis-(4-aminophenyl)methane and 26 mls of acetic acid were mixed together in a 2-liter round bottom flask and heated to 70° C. 0.55 mls of triethylamine were added and the temperature increased to 80° C. After 1.8 hours the solution viscosity had increased to 30 cps and the polymer was precipitated in 3-gallons of distilled water, filtered, washed and dried.

A prepreg was made from this polymer as in the previous example from a 62.8% solids solution in dimethylformamide. It was heated at 150° C. for 10 minutes.

An 8-ply, double-sided copper clad laminate was made from this prepreg. The laminate was made in a press as in the previous example. It contained 42% resin. Without postcure it has a room temperature flexural strength of 70,000 psi and a flexural strength of 46,000 psi at 204° C. (after etching the copper off).

EXAMPLE 3

322 g of maleic N,N'-4,4'-diphenyl-methane-bisimide, 176 g of 1,1'(1,4-phenylene)-bis-4-methyl-1,3-pentanedione, 459.4 g of bis-methoxy ethyl ether, 23.2 g of bis-(4-aminophenyl)methane, 26.2 g distilled water, .12 mls methane sulfonic acid and 0.72 g p-benzoquinone was mixed together in a 2-liter round bottom flask and heated to 103° C. This solution was cooled to 90° C. and 2.4 mls of triethylamine were added. The temperature was increased to 100° C. and after 15 minutes the solution viscosity was 60 cps. The polymer was precipitated in distilled water, filtered, washed and dried.

A prepreg was made and postcured as in the previous examples from a 66.3% solids solution in dimethylformamide.

An 8-ply, double-sided copper clad laminate was made from this prepreg in a press. The laminate was made using a press temperature of 200° C. and a pressure of 400 psig. It was held in the press for one hour. It was not postcured. The laminate had a copper peel strength of 8 lbs/in and a water absorption of 25.5 mg on a 2"×2" square.

EXAMPLE 4

112 g of 1,1'(1,4-phenylene)-bis-4-methyl-1,3-pentanedione, 14.8 g of bis-(4-aminophenyl-methane, and 0.0166 g of p-benzoquinone were mixed in a 500 ml round bottom flask and heated to 120° C. 205.4 g of maleic N,N'-4,4'-diphenylmethane-bis-imide were added over 15 minutes. After 2 hours at 120° C. the melt was poured out, cooled and ground.

A 65.0% solids solution of this powder in dimethylformamide was used to make a prepreg as in the previous examples. The prepreg was heated at 150° C. for 10 minutes.

8-ply, double-sided copper clad laminates were made from this prepreg in a press. The press conditions are the same as used in Example 1. The laminates were postcured for 1 hour at 200° C. The laminates contained 30% resin. Their physical properties are summarized in Table 2.

TABLE 2
PHYSICAL PROPERTIES OF LAMINATES FROM EXAMPLE 4

| PROPERTY | VALUE |
|---|---|
| Copper Peel Strength (Lb/in) | |
| Room Temperature | 7.4 |
| After Thermal Stress | 7.4 |
| Volume Resistivity (megohm/c) | |
| After $H_2O$ Resistance (room temp.) | $1.5 \times 10^9$ |
| Surface Resistivity (megohm/c) | |
| Dry (room temp.) | $1 \times 10^9$ |
| Water Absorption (mg) | 22.5 |
| Dielectric Constant | 4.6 |
| Dissipation Factor | 0.008 |
| Flexural Strength ($10^3$ psi) | |
| Room Temperature | 71 |
| ARC Resistance (Seconds) | 181 |
| Machinability (router) | OK |
| Solder Float (550° F./10 Secs.) | No Blist. |
| Flammability | V-O |
| CTE ($10^{-6}$ in/in/deg °F.) | 6.4 |
| Tg (°C.) | 258 |

TABLE OF FORMULAS

I.

II.

$R^3$—COCH$_2$—COZCOCH$_2$COR$^3$   IIIa.
$R^3$—COCH$_2$COCH$_2$COR$^3$   IIIb.

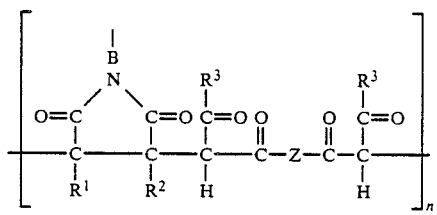

IVa.

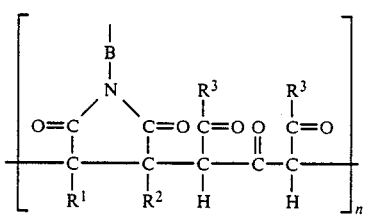

IVb.

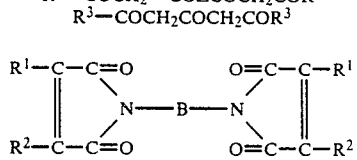

—NR$^{14}$—, —POR$^{13}$—, —N=N—, —N=NO—,   V

—CO$_2$—, —SO$_2$—, —SiR$^{13}$R$^{14}$—, —CONH—,

—NY—CO—Q—CO—NY—, —O$_2$C—Q—CO$_2$—,

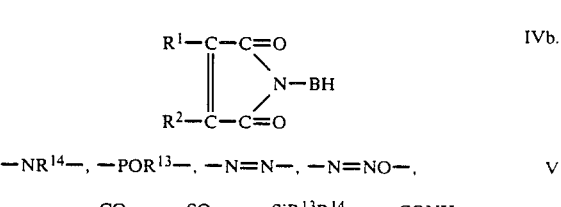

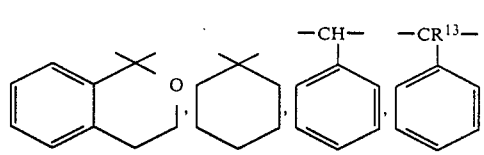

(CH$_3$CH$_2$)$_2$NH, (CH$_3$CH$_2$)$_3$N, (CH$_3$CH$_2$CH$_2$)$_2$NH   VI

-continued
TABLE OF FORMULAS

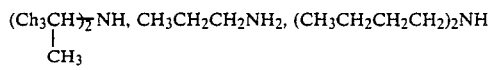

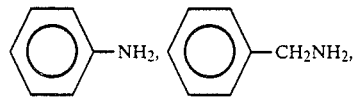

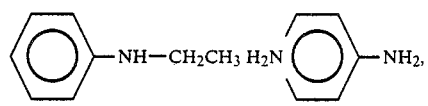

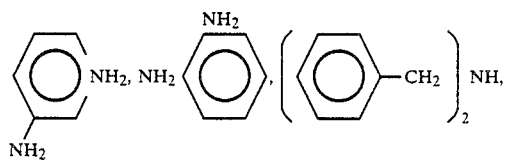

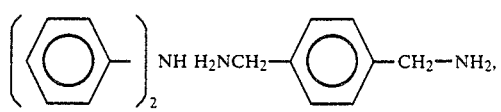

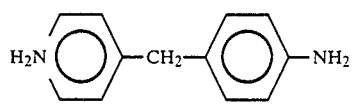

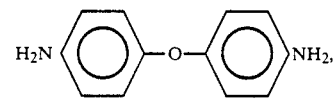

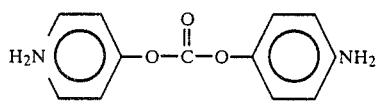

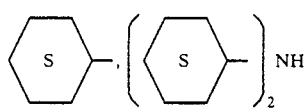

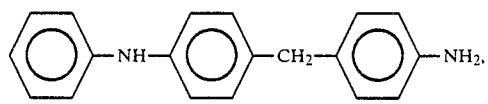

-continued
TABLE OF FORMULAS

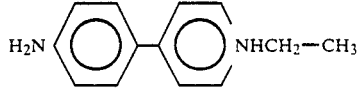

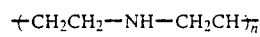

$NR^3R^5R^6$     VII
$R^4R^5N-X-NR^6R^7$     VIII

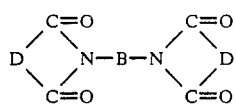     IX

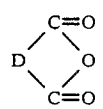     X

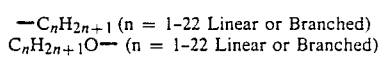     XI

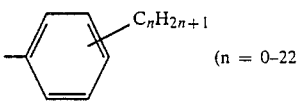

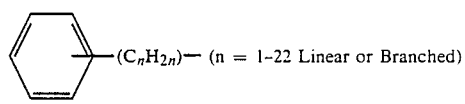

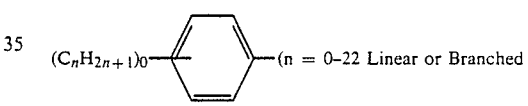

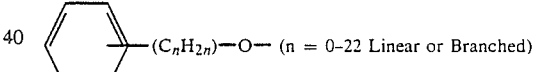

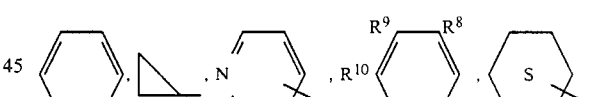

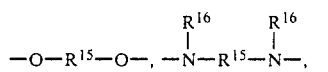     XII

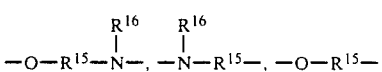

What is claimed is:

1. The polyimide addition polymer made by reacting (1) a monomer having two methylene groups activated by adjacent carbonyls with (2) an ethylenically unsaturated bis-imide compound and (3) polyamines selected from a compound having the general formulas $NR^3R^5R^6$ or $R^4R^5N-x-N-R^6R^7$, where $R^3$ is independently selected from hydrogen, monovalent alkyl, aryl, alkyl aryl or alkoxy groups having 1–30 carbon atoms and $R^4$, $R^5$, $R^6$ and $R^7$ are independently selected from hydrogen, alkyl, cycloalkyl, aryl, aryl alkyl radicals having up to 20 carbon atoms, provided that at least one of $R^3$, $R^4$, $R^5$, $R^6$ and $R^7$ must be H.

* * * * *